(No Model.)

B. GOLDMANN.
FILTER.

No. 246,003. Patented Aug. 23, 1881.

Witnesses,
Geo. H. Strong.
Frank A. Brooks

Inventor,
Benno Goldmann.
By Dewey & Co.
Attys

UNITED STATES PATENT OFFICE.

BENNO GOLDMANN, OF SAN FRANCISCO, CALIFORNIA, ASSIGNOR OF THREE-FOURTHS TO WILLIAM UNFUG, JOHN OTTO KLEWISCH, AND HARRY LEWIS, OF SAME PLACE.

FILTER.

SPECIFICATION forming part of Letters Patent No. 246,003, dated August 23, 1881.

Application filed February 14, 1881. (No model.)

*To all whom it may concern:*

Be it known that I, BENNO GOLDMANN, of the city and county of San Francisco, State of California, have invented an Improved Filter; and I hereby declare the following to be a full, clear, and exact description thereof.

My invention relates to certain improvements in filters which may be employed to purify oils, sugar sirups, or any liquids upon which such an operation is necessary.

It consists of a chamber which is adapted to receive the liquid into its lower part through a pipe under pressure. In the upper part is the filter, which may be composed of any suitable material or substance for the purpose to which the filter is to be applied, and above this is placed a discharge-pipe.

My invention further consists of a novel means for cleaning the filter without removing any of the parts or reversing it, all of which will be more fully described by referring to the accompanying drawings, in which—

Figure 1:
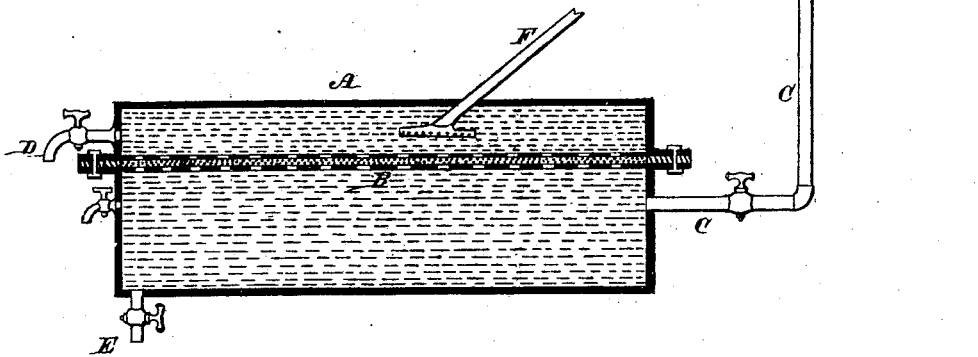
Figure 2:
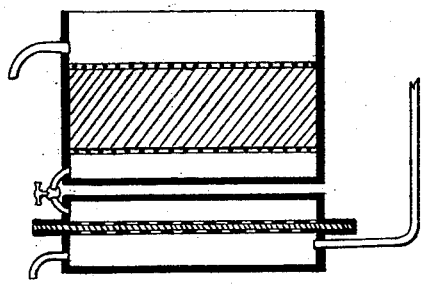

Figure 1 is a vertical section taken through my filter, showing one form of construction. Fig. 2 is a modification.

A is a vessel or chamber having a diameter sufficient for the quantity or character of the liquid to be filtered. This chamber may be made of any suitable material, and is closed, except at the inlets and outlets, as hereinafter described. For convenience it may be made in sections, which are held together by bolts or other suitable fastening, so that they may be separated, to inspect or change the filter, if desired.

Above and below the filtering material B are placed perforated plates or targets, which support the filter and resist the upward pressure when filtering and the downward pressure when cleaning the filter.

The filter B extends across the chamber at a point some distance above the bottom, and it may be composed of perforated metal, with sheets of felt or other filtering material between. If charcoal or bone-coal is used for purifying or decolorizing, the vessel containing the same may be connected with the discharge-pipe of the filter, which enters it between the bottom of the charcoal or bone-coal vessel and the filter material. Below this filter is a supply-pipe, C, through which the liquid enters, and above it is a discharge-pipe, D.

When the lower part of the chamber is full the pressure causes the liquid to pass upward, thus leaving all the impurities upon its lower side.

Whenever it becomes necessary to clean the filter, if the filtrate be oil or similar material, I draw off from the lower part of the chamber, through a cock, E, until the liquid is just clear of the bottom of the filter, and it may be drawn off from above the filter until there is only a thin body above it. Air, vapor, or gas is then admitted into the upper chamber, and by its pressure the oil is forced downward through the filter into the chamber below, thus washing off and cleansing the lower surface of the filter with the clean liquid, and without reversing or changing the filter in any way. The impurities are never upon the upper or discharge surface, as would be the case with a reversing filter, and I have a body of pure material to be forced back through the filter to cleanse it.

When the filtrate is water, sugar sirup, or other similar substance, I prefer to use a steam-jet to cleanse the filter, and it may be done by admitting the steam into the upper chamber under pressure, or it may be admitted through a pipe, F, having an enlarged foot, which may be moved around over the surface of the filter, so that the steam will pass through every part of it, and thus clean its lower surface.

In many cases it is necessary to heat the material to be filtered, and when ordinary filters are employed it is often a troublesome or inconvenient process.

In my apparatus I may employ a gas-jet or other suitable heater, which is applied beneath the chamber, so that the material may be heated in a thin stratum or body as it enters the chamber, and no more heat is needed than sufficient to liquefy the material as it passes through the chamber.

It will be manifest that pipes may be placed within the chamber, so that steam or hot air can be passed through them to heat the material as it enters the chamber.

By this construction of a filter I pass the material upward through it, and it is thus filtered under the most favorable circumstances, all the impurities being left in the chamber beneath. For this reason the filter will not be clogged nearly as soon as when the impurities are deposited upon the top. It is also very easy to clean, as I always have a body of pure material above the filter, which may be forced downward through it, and thus wash off the lower surface, the impurities dropping immediately to the bottom of the chamber, from which they may be removed through a suitable cock or discharge, G.

By this process I am enabled to effect a great saving of material to be filtered and of the filter material.

Having thus described my invention, what I claim as new, and desire to secure by Letters Patent, is—

1. In a filter for oils, sugar sirups, and similar liquids, the case A, made in two close sections bolted together at the center and holding between them the filtering-diaphragm B, said case having an inlet-passage and a discharge-passage above the filtering-diaphragm, and provided with a pressure-pipe in the upper part, by which a pressure may be brought upon the surface of the liquid above the filter, to force it back through the same, substantially as and for the purpose herein described.

2. The filter B, fitted between the closed receiving and discharging chambers of the case A, which is provided with inlet and outlet passages, through which the liquid may be forced, in combination with the pipe F, having an enlarged foot, substantially as and for the purpose herein described.

In witness whereof I have hereunto set my hand.

BENNO GOLDMANN.

Witnesses:
FRANK A. BROOKS,
S. H. NOURSE.